(12) United States Patent
Troia et al.

(10) Patent No.: US 12,164,904 B2
(45) Date of Patent: Dec. 10, 2024

(54) METHOD FOR UPDATING A SENSOR SYSTEM IN AUTOMOTIVE APPLICATIONS

(71) Applicant: Renesas Electronics America Inc., Milpitas, CA (US)

(72) Inventors: Alberto Troia, Dusseldorf (DE); Gentjan Qama, Dusseldorf (DE); Syed Khurram Zaka Bukhari, Dusseldorf (DE)

(73) Assignee: Renesas Electronics America Inc., Milpitas, CA (US)

( * ) Notice: Subject to any disclaimer, the term of this patent is extended or adjusted under 35 U.S.C. 154(b) by 79 days.

(21) Appl. No.: 18/160,303

(22) Filed: Jan. 26, 2023

(65) Prior Publication Data
US 2023/0236821 A1    Jul. 27, 2023

(30) Foreign Application Priority Data

Jan. 27, 2022    (EP) .................................... 22153765

(51) Int. Cl.
| | |
|---|---|
| *H04L 29/06* | (2006.01) |
| *G06F 8/65* | (2018.01) |
| *G06F 9/445* | (2018.01) |
| *G06F 21/00* | (2013.01) |
| *H04L 9/08* | (2006.01) |
| *H04L 9/14* | (2006.01) |
| *H04L 9/30* | (2006.01) |

(52) U.S. Cl.
CPC .................. *G06F 8/65* (2013.01); *H04L 9/08* (2013.01); *H04L 9/14* (2013.01)

(58) Field of Classification Search
CPC ..... G06F 8/65; H04L 9/08; H04L 9/14; H04L 63/062; H04L 67/34; H04L 63/123; H04L 67/12; H04L 9/3297; H04L 9/3006; H04L 9/3239; H04L 9/50; H04L 9/3247; H04L 9/088

See application file for complete search history.

(56) References Cited

U.S. PATENT DOCUMENTS 12,052,345 B2 * 7/2024 Troia .................... H04L 9/3263
2018/0217828 A1   8/2018 Madrid et al.
2019/0342081 A1 * 11/2019 Tanimoto .............. H04L 9/0894

OTHER PUBLICATIONS

Extended European Search Report dated Jul. 1, 2022 received in European Patent Application No. EP 22153765.7.

\* cited by examiner

*Primary Examiner* — Thuy Dao
(74) *Attorney, Agent, or Firm* — SCULLY, SCOTT, MURPHY & PRESSER, P.C.

(57) ABSTRACT

A sensor system and an update server perform a method for updating the sensor system. The update server performs steps of retrieving a pre-shared sensor key associated with the sensor system, calculating a server signature based on update data and the retrieved sensor key, and transmitting the update data and the calculated server signature to the sensor system. On the other hand, the sensor system performs steps of receiving the update data and the calculated server signature, retrieving the pre-shared sensor key stored in a register, calculating a sensor system signature based on the update data and the pre-shared sensor key, comparing the sensor system signature with the server signature and processing the update data if the sensor system signature and the server signature are identical.

14 Claims, 4 Drawing Sheets

METHOD FOR UPDATING A SENSOR SYSTEM IN AUTOMOTIVE APPLICATIONS

CROSS-REFERENCE TO RELATED APPLICATION

This application claims priority under 35 U.S.C. § 119 to European Patent Application No. EP 22153765.7, filed on Jan. 27, 2022. The entire disclosure of European Patent Application No. EP 22153765.7 is incorporated by this reference.

BACKGROUND

The invention relates to a method for updating a sensor system in automotive applications, such as a sensor system of an Advanced Driver Assistance System.

Sensor systems in automotive applications have increased complexity, particularly due to popularity of Advanced Driver Assistance Systems (ADAS) like emergency (braking) system, road signs and signals detection, lane assistance, and the like. These Advanced Driver Assistance Systems are a necessary part for autonomous driving applications.

Advanced Driver Assistance Systems comprise for example a Light Detection and Ranging (LIDAR) system to monitor the surroundings of cars to issue an alert to the driver or to initiate an emergency brake in case the car is on a collision course with objects, persons or the like. Other sensor systems in Advanced Driver Assistance Systems are used to detect road signs and signals, road markings and/or state variable of the car like the speed of the car.

The increased complexity of the sensor systems requires for example unregular updates of the sensor systems like updating software components or parameters of the sensor system.

Conventionally, these updates are for example performed by sending a certain sequence from the update server to the sensor system, usually using the I2C Interface (Inter-Integrated Circuit Interface (Bus)) to enter the sensor system into an admin-mode (test-mode). In this admin-mode the update can be send to the sensor system and be installed locally. The update must be installed in a service garage because a client device must be connected to the vehicle using e.g., the ODB port of the vehicle.

A human must connect the client device with the ODB port and install the update, which is time consuming. Furthermore, the owner of the car must bring the car to the service garage and wait until the update is installed.

Due to the importance of sensor systems in Advanced Driver Assistance Systems, particularly for autonomous driving applications, the standard ISO/SAE 21434:2021 specifies engineering requirements for cybersecurity risk management regarding concept, product development, production, operation, maintenance and decommissioning of electrical and electronic (E/E) systems in road vehicles, including their components and interfaces.

It is therefore an object to provide security means for updating sensor systems in automotive applications such as sensor systems of an Advanced Driver Assistance System.

SUMMARY

The object can be solved by a method for updating a sensor system in automotive applications such as a sensor system of an Advanced Driver Assistance System, comprising at an update server side the steps of:

retrieving a pre-shared sensor key associated with the sensor system to be updated, calculating a server signature based on update data and the retrieved sensor key, transmitting the update data and the calculated server signature to the sensor system to be updated, comprising at the sensor system to be updated the steps of:

receiving from the update server the update data and the calculated server signature, retrieving the pre-shared sensor key stored in an internal register of the sensor system to be updated, calculating a sensor system signature based on the received update data and the retrieved pre-shared sensor key, comparing the sensor system signature with the server signature and processing the update data only if the sensor system signature and the server signature are identical.

Update data according to the present disclosure is the data provided by the update server, that is transmitted to the sensor system and installed locally in the sensor system to update software components or parameters of the sensor system.

For example, the update server is located at the car manufacturer, i.e., at the OEM side.

According to the present disclosure the update server calculates a server signature based on the update data and a pre-shared sensor key. The pre-shared sensor key is known to the sensor system and the update system only. Afterwards the update server transmits the update data and the calculated server signature to the sensor system to be updated.

Upon receiving the update data and server signature from the update server the sensor system to be updated retrieves the pre-shared sensor key from an internal register and calculates a sensor system signature based on the received update data and the retrieved pre-shared key.

If the update data has not been amended during transfer, the server signature and the sensor system signature must be equal because both have been calculated based on the same (unamended) update data and pre-shared key. Obviously, the update server and the sensor system to be updated use the same cryptography primitive (algorithm) to calculate the server signature respectively the sensor system signature.

Thus, the sensor system to be updated compares the sensor system signature with the server signature and processes the update data only if the sensor system signature and the server signature are identical.

If the update data has been amended during transfer, e.g., intentionally by an attacker or unintentionally/randomly by noise, the calculated sensor system signature differs from the server signature because the sensor system signature has been calculated based on the amended update data. The method according to the present disclosure provides integrity of the update data. The inventive method can therefore provide additionally safety coverage against transmission errors as per ISO26262:2018 part 2 annex E recommendations.

Since the server signature and the sensor system signature are both calculated based on a pre-shared key the method according to the present disclosure further provides authenticity of the update data, i.e., only the update server knowing the pre-shared key can send valid update data to the sensor system.

Therefore, the method according to the present disclosure provides data attestation and protection, i.e., the sender of the update data is verified and the update data itself is protected.

The method according to the disclosure can be easily implemented, even in small sensor system having limited computational resources, because only signatures must be calculated and compared, which is computationally an easy task. This also reduces the required system RAM at the sensor system side.

In a variant, the calculation of the server signature and the calculation of the sensor system signature uses a Hash function, for example being based on one of the following algorithms: Elliptic Curve Algorithm, SHA256, SHA1, MD5 or similar algorithms. Hash functions are computationally simple and at the same provide secure results. The Hash function provides a short digest of a set of data, in this case of the update data. By including the pre-shared key in the Hash function the digest can be regarded as a signature because only the owners of the pre-shared key can calculate respectively check the digest of the Hash function. The pre-shared key is used by the Hash function to prevent that an attacker calculates a correct digest based on the generally known Hash function for the amended update data.

Pursuant to a variant, the method further comprises the step of encrypting the update data using the pre-shared key at the update server side and decrypting the encrypted update data using the pre-shared key at the sensor system, for example encrypting the update data before the server signature is calculated and decrypting the update data only if the server signature and the sensor system signature are identical. The encryption/decryption requires increased computational resources, which is usually only a restriction at the sensor system side. In case the sensor system provides sufficient computational and memory resources for the decryption, the content of the update data can be hidden from attackers by using encryption.

According to a further variant, the method further comprises at the update server side the step of including a freshness in the calculation of the server signature and transmitting the freshness together with the update data and the server signature to the sensor system to be updated, at the sensor system to be updated the step of including the received freshness in the calculation of the sensor system signature. The freshness is used to avoid replay attacks of old update messages send by an attacker. For example, the freshness is calculated based on a pseudo random number calculation, time information, GPS information or similar information. Only if the freshness information is new and has not been used previously, the sensor system to be updated will process the update data and check the server signature. If the freshness information has been used in previous update data, the sensor system can disregard the received information. Thus, the method in this variant provides anti-replay protection.

In a variant, the method further comprises at the update server side the steps of:
segmenting the update data into multiple chunks,
calculating for each update data chunk the server signature, and transmitting each update data chunk together with the corresponding server signature to the sensor system to be updated, and at the sensor system to be updated the steps of:
calculating the sensor system signature for each received update data chunk,
comparing the sensor system signature with the corresponding server signature for each received update data chunk,
reassembling the update data from the received update data chunks only if for each received update data chunk the calculated sensor system signature is identical to the corresponding server signature.

In this way, the update server can send large update data files to the sensor system to be updated, even if the large update data file cannot be sent in a single message. If the optional freshness is used, a different freshness value is used for each chunk of the update data.

Pursuant to a variant, the update server calculates the total size of the update data and the size of the update data chunks on basis of the total update data and the maximum size of data packages that can be transmitted from the update server to the sensor system to be updated.

According to a variant, the method further comprises at the update server side the steps of:
calculating a global server signature based on the unsegmented update data, the retrieved sensor key and optional freshness after all update data chunks have been transmitted to the sensor system to be updated,
and transmitting the global server signature and optional freshness to the sensor system to be updated,
and at the sensor system to be updated the steps of:
calculating a global sensor system signature based on the reassembled update data from all received update data chunks, the retrieved sensor key and optional received freshness, and processing the reassembled update data only if the global sensor system signature and the global server signature are identical.

The global server signature and global sensor system signature are used to check the completeness of the separate update data chunks.

Additionally, the integrity of the complete update data is double-checked. An optional freshness can be added to the global server signature and sent to the sensor system.

According to a variant, the sensor system to be updated initiates the update procedure by transmitting an update request to the update server, wherein the update request comprises at least a sensor system ID and optionally further necessary information, and wherein the update server can retrieve the sensor key based on the received sensor system ID.

Pursuant to a variant the sensor system calculates a sensor system signature for the update request based on the information inside the update request, the retrieved sensor key and optional freshness, and the update server calculates a server signature based on the information received in the update request, the retrieved sensor key and optional received freshness in the update request, and wherein the update server only processes the update request if the calculated server signature and the received sensor system signature are identical. In this way the update server can check if the update request originates from a valid sensor system or was sent by an attacker.

In a variant, the transmissions between the update server and the sensor system to be updated are sent over the air and/or over vehicle connectivity. Sending update data over the air can have the advantage that the sensor system can be updated on-the-fly without the need to recall vehicles from the field. Usually, modern vehicles already have built-in mobile communication interfaces like means, like 4G or 5G communication interfaces. These existing mobile communication interfaces can be used to receive update data from the update server. On the other hand, using vehicle connectivity provides enhanced security, as the update data can only be sent to the sensor system if a physical connection is established to the vehicle. As the vehicle connectivity connection point is usually inside the car, the access is limited.

According to a variant, the update server stores sensor keys for multiple sensor systems in a database. The update server is responsible for sending update data to multiple sensor systems.

For each sensor system a pre-shared sensor key must be securely stored. The update server has to guarantee the safety of the stored sensor keys.

Pursuant to a variant, each sensor system stores the sensor key on chip. For example, the sensor key is stored on chip as non-readable information, which can be only used for calculations. In this way it is guaranteed that no one can read out the sensor key from the sensor system. The sensor key can only be used for calculation, such as for calculating the sensor system signature based on data like a received update data, freshness and/or update request.

BRIEF DESCRIPTION OF THE DRAWINGS

In the following, various embodiments will be further explained with respect to the figures. The figures show.

DETAILED DESCRIPTION

Figure 1:
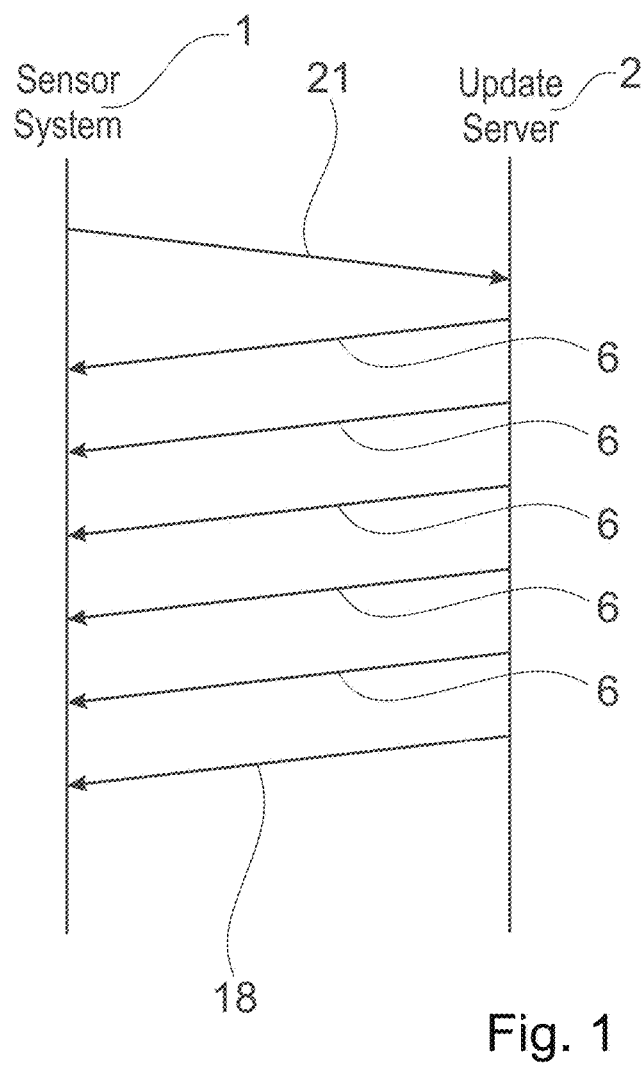
FIG. 1 a flow diagram of messages exchanged between a sensor system and an update server during an update of the sensor system using the method according to the present disclosure, FIG. 2 a flow diagram of the sensor system when transmitting an update request to the update server, FIG. 3 a flow diagram of the update server when receiving an update request and sending update data to the sensor system, FIG. 4 a flow diagram of the sensor system when receiving update data from the update server, FIG. 5 an exemplary view of a message containing an update request, FIG. 6 exemplary views of messages containing update data chunks, and FIG. 7 an exemplary view of a message containing a global server signature.

FIG. 1 shows a flow diagram of messages exchanged between a sensor system 1 and an update server 2 during an update of the sensor system 1 using the method according to the present disclosure. The present disclosure refers to a method for updating a sensor system 1 in automotive applications, such as sensor system 1 of an Advanced Driver Assistance System.

According to the embodiment shown in FIG. 1 the sensor system 1 in a first step transmits 21 an update request 22 to the update server 2.

Figure 2:
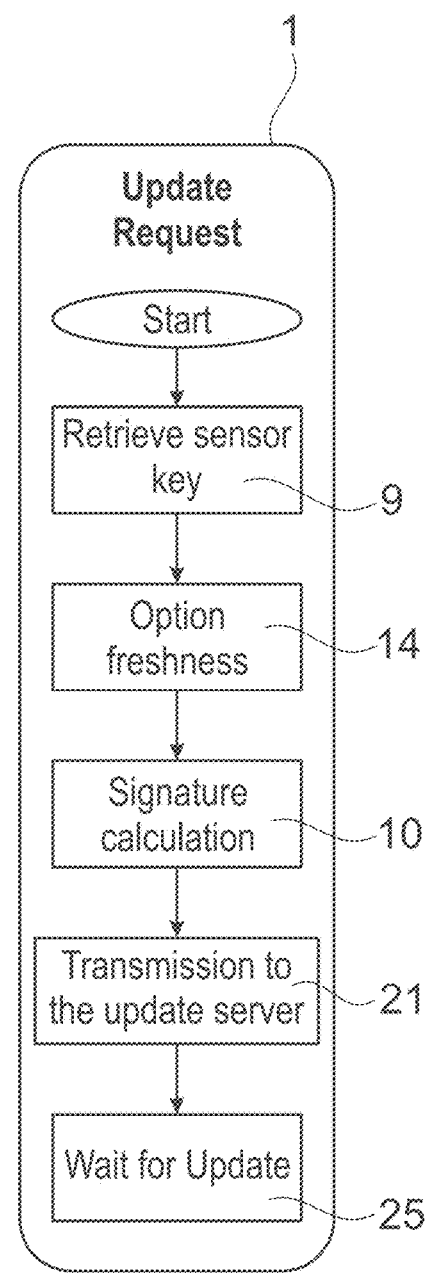

FIG. 2 shows an exemplary flow diagram of the sensor system 1 when transmitting 21 an update request 22 to the update server 2. Once the sensor system 1 has started the update procedure, the sensor system 1 in a first step retrieves 9 a pre-shared sensor key stored in an internal register of the sensor system 1 to be updated. In an optional next step the sensor system 1 can include 14 a freshness 13 in the update request 22, for example based on a pseudo random number calculation, time information, GPS information or similar information.

The update request 22 of the sensor system 1 for example contains a sensor ID for identifying the sensor system 1 at the update server 2 and possible further information. The update request 22 can further relate to the optional freshness 13 information. Based on this information the sensor system 1 calculates 10 a sensor system signature 24. The calculation 10 of the sensor system signature 24 uses for example a Hash function, for example being based on one of the following algorithms: Elliptic Curve Algorithm, SHA256, SHA1, MD5 or similar algorithms.

The update request 22 together with the freshness 13 and the sensor system signature 24 is transmitted to the update server 2.

Afterwards the sensor system 1 waits 25 for the update data 7 transmitted 6 from the update server 2 to the sensor system 1.

Figure 5:
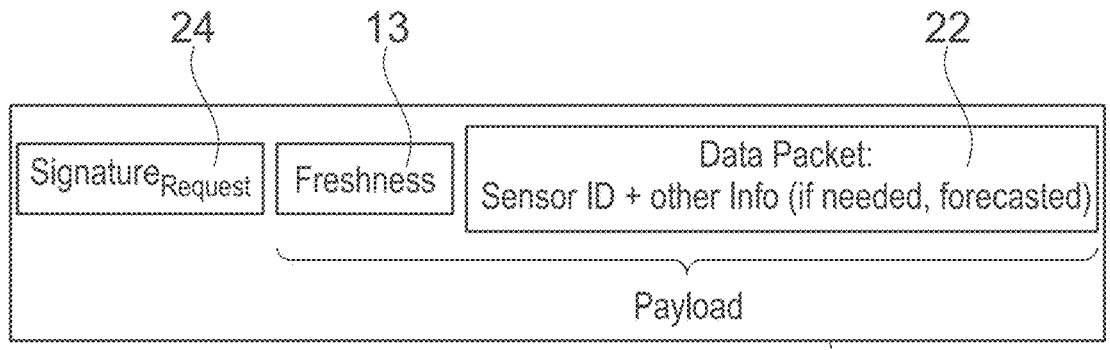

FIG. 5 shows an exemplary view of the message 26 containing an update request 22. The message 26 contains the sensor system signature 24, the freshness 13 and the update request 22, wherein the update request 22 for example contains a sensor ID and possible further relevant information.

According to the flow diagram of messages shown in FIG. 1 the update server 2 receives the update request 22 and in return transmits 6 on or more update data chunks 7 to the sensor system 1. According to FIG. 1 the update server 2 transmits in total six update data chunks 7 to the sensor system 1.

Figure 3:
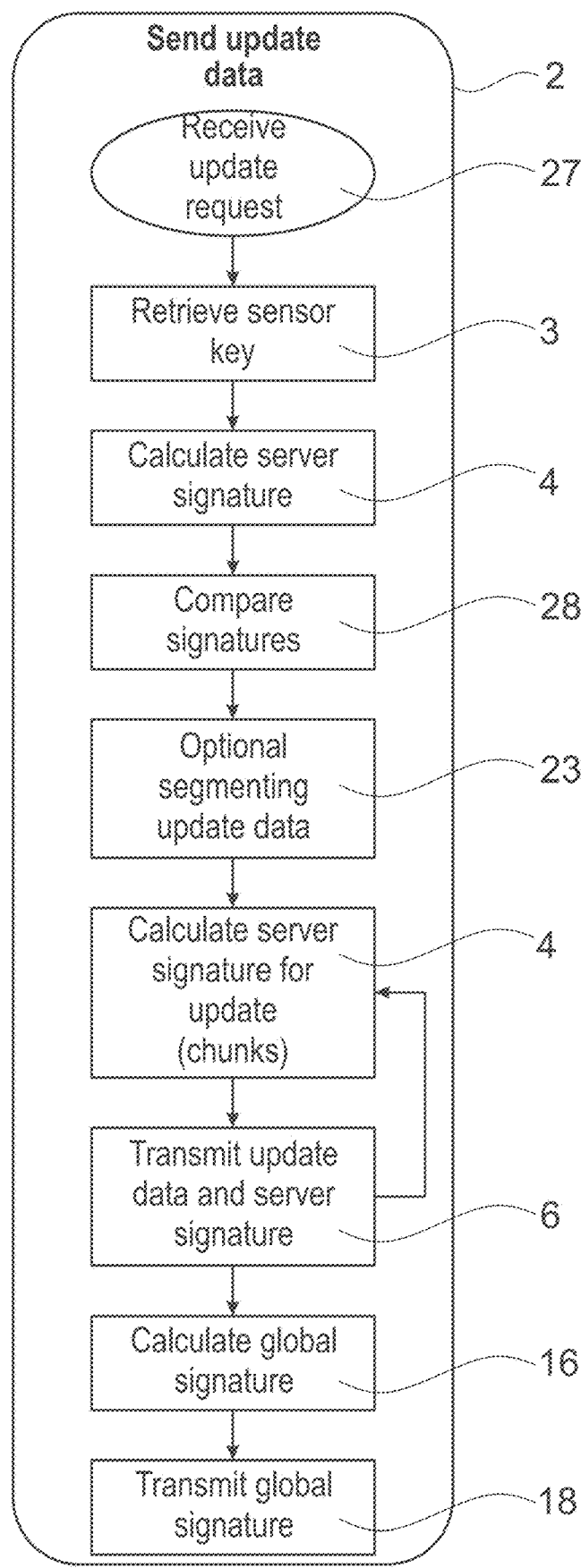

FIG. 3 shows a flow diagram of the update server 2 when receiving 27 an update request 22 and sending update data 7 to the sensor system 1.

In a first step the update server 2 retrieves 3 the pre-shared key associated with the sensor system 1 to be updated. The retrieval 3 of the pre-shared key bases for example on the information contained in the update request 22, like the sensor ID.

In the next step the update server 2 calculates 4 a server signature 5 based on the update request 22, the freshness 13 included in the message 26 and the retrieved 3 pre-shared sensor key. The update server 2 compares 28 the calculated 4 server signature 5 and the received sensor system signature 24 from the message 26 and proceeds with the update only if the server signature 5 and the sensor system signature 24 are identical.

Otherwise, the update process is terminated.

In an optional next step, the update server 2 can segment 23 the update data 7 into multiple chunks. For example, the update server 2 calculates the total size of the update data 7 and the size of the update data chunks 7 on basis of the total update data 7 and the maximum size of data packages that can be transmitted from the update server 2 to the sensor system 1 to be updated, also considering the overhead needed for the transmission 6 of the update data 7 including the server signature 5.

For each update data chunk 7 a separate server signature 5 is calculated 4. The separate server signature 5 bases on the update data chunk 7, the retrieved 3 sensor key and an optional included 12 freshness 13, wherein the freshness 13 is different for each update data chunk 7. The calculation 4 of the server signature 5 and the calculation 19 of the sensor system signature 24 use the same function, like a Hash function, for example being based on one of the following algorithms: Elliptic Curve Algorithm, SHA256, SHA1, MD5 or similar algorithms.

Each update data chunk 7 is transmitted 6 together with the corresponding server signature 5 and optional freshness 13 to the sensor system 1. The process of transmitting 6 the update data chunks 7 is repeated until all update data chunks 7 have been transmitted 6 to the sensor system 1 to be updated.

Figure 6:
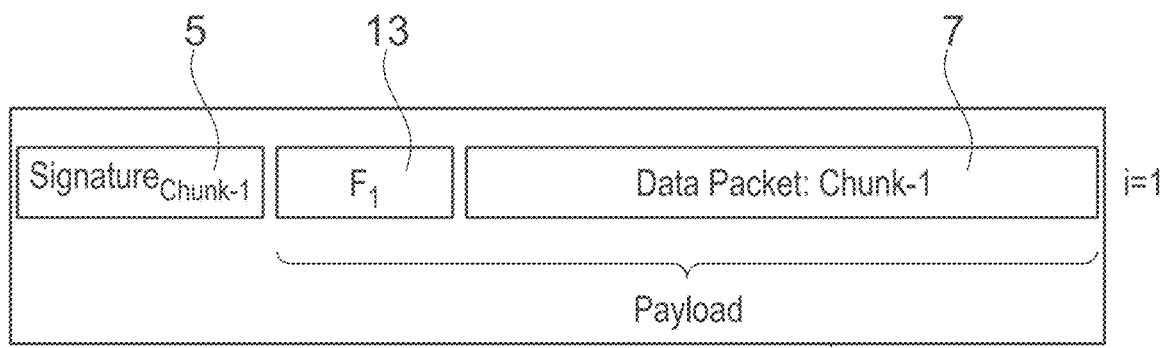
Figure 6:
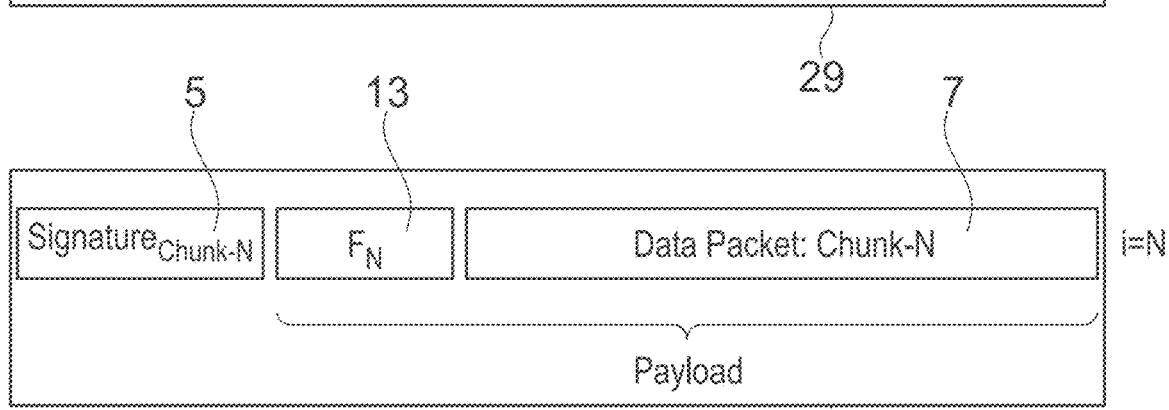

FIG. 6 shows exemplary views of messages containing update data chunks 7. Each transmitted 6 message 29 contains the calculated 4 server signature 5 for that update data chunk 7, the respective freshness 13 for that update data chunk 7 and the update data chunk 7 itself. FIG. 6a) shows the message 29 of the first update data chunk 7 and FIG. 6n) shows the message 29 of the n-th update data chunk 7.

As shown in FIG. 3, after all update data chunks 7 have been transmitted 6 to the sensor system 1 to be updated, the update server 2 calculates 16 a global server signature 17. The global server signature 17 bases on the retrieved 3 sensor key, an optional separate freshness 13 and the complete update data 7.

The calculated 16 global server signature 17 is transmitted 18 to the sensor system 1 to be updated. This is the last transmitted message 30 shown in FIG. 1.

Figure 7:
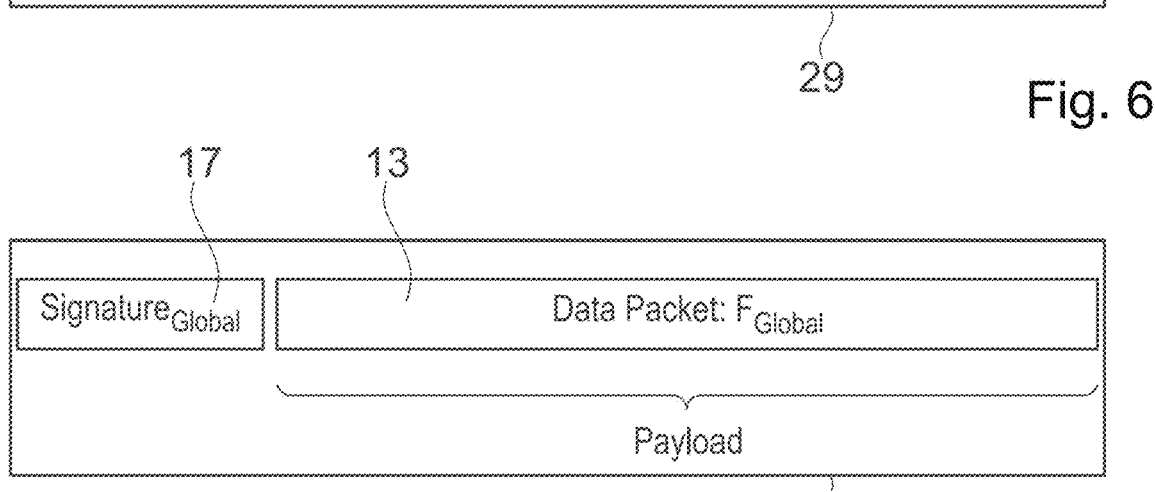

FIG. 7 shows an exemplary view of the message 30 containing the global server signature 17 and the corresponding optional freshness 13.

Figure 4:
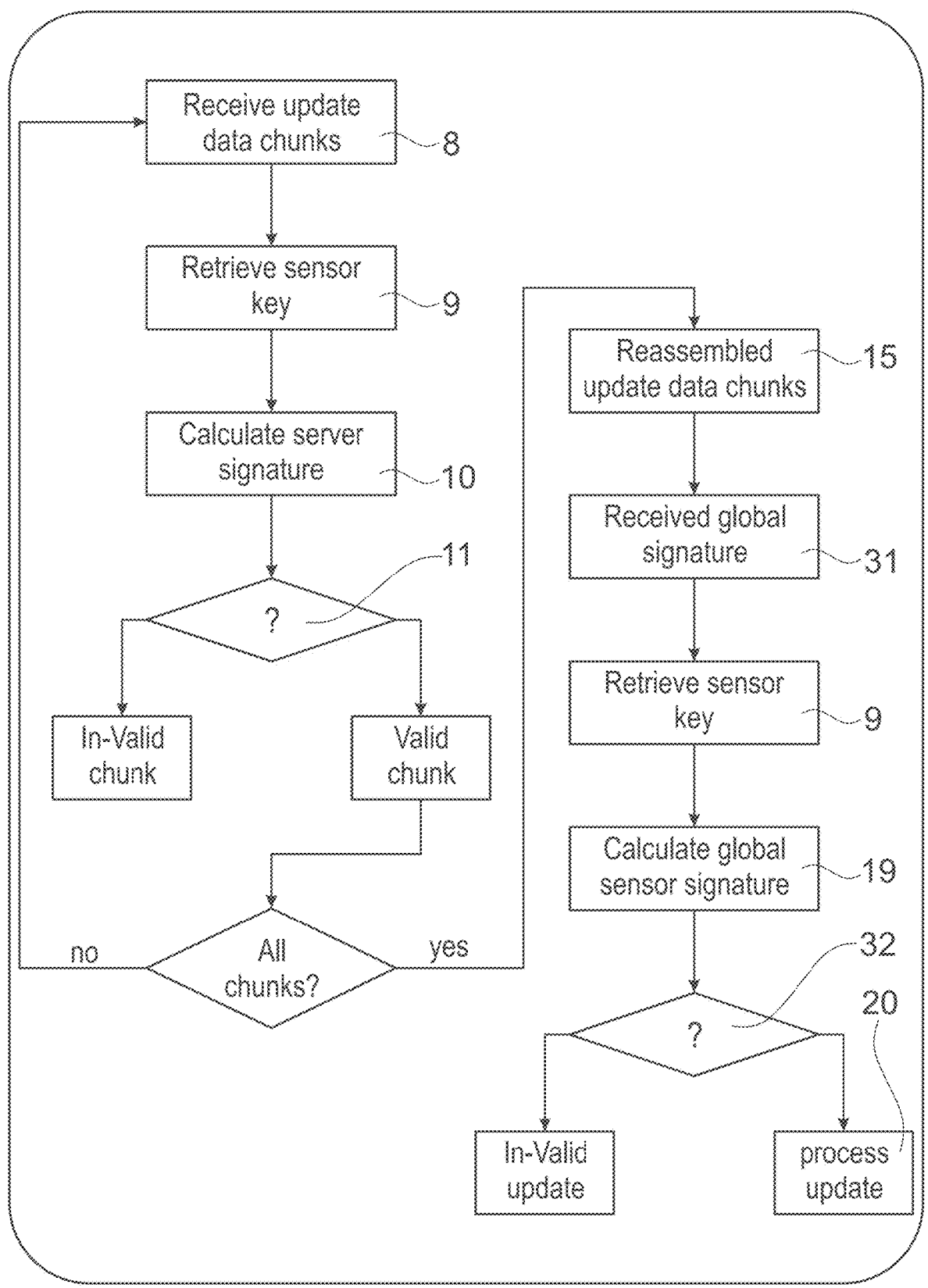

FIG. 4 shows a flow diagram of the sensor system 1 when receiving 8 update data 7 from the update server 2. The sensor system 1 receives from the update server 2 the messages 29 containing the update data chunks 7 sequentially. For each received update data chunk 7 the sensor system 1 retrieves 9 the sensor key stored in an internal register and calculates 10 the sensor system 1 signature 24 based on the received update data chunk 7, the retrieved sensor key and the optional freshness 13 contained in received message 29 of that update data chunk 7.

The sensor system 1 compares the calculated 10 sensor system signature 24 with the received server signature 5 from message 29 and only further processes the update data chunk 7 if the sensor system signature 24 and the server signature 5 are identical. This procedure is repeated until all update data chunks 7 have been received.

If all update data chunks 7 have been received and checked by comparing the respective sensor system signatures 24 with the corresponding server signatures 5 the update data chunks 7 are reassembled 15 to the update data 7.

Afterwards, previously or in parallel the sensor system 1 receives 31 the message 30 containing the global server signature 17 and the optional freshness 13. The sensor system 1 uses the retrieved 9 sensor key and the optional freshness 13 from message 30 to calculate 19 a global sensor system signature. The global server signature 17 and the global sensor system signature are compared 32 and the reassembled update data 7 is only processed 20 if the global server signature 17 and the global sensor system signature are identical.

The method according to the present disclosure can comprise the additional step of encrypting the update data 7 respectively update data chunks 7 using the pre-shared key at the update server side 2 and decrypting the encrypted update data 7 using the pre-shared key at the sensor system 1, for example encrypting the update data 7 before the server signature 5 is calculated 4 and decrypting the update data 7 at the sensor system side 1 only if the server signature 5 and the sensor system signature 24 are identical.

The transmissions 21, 6, 18 between the update server 2 and the sensor system 1 to be updated are sent over the air and/or over vehicle connectivity.

The update server 2 stores sensor keys for multiple sensor systems 1 for example in a database and each sensor system stores the sensor key for example on chip, for example as non-readable information, which can be only used for calculations.

What is claimed is:

1. A method for updating a sensor system, the method comprising:
performing at an update server side:
retrieving a pre-shared sensor key associated with the sensor system to be updated;
calculating a server signature based on update data and the retrieved pre-shared sensor key; and
transmitting the update data and the calculated server signature to the sensor system to be updated; and
performing at the sensor system to be updated:
receiving from the update server the update data and the calculated server signature;
retrieving the retrieved pre-shared sensor key stored in an internal register of the sensor system to be updated;
calculating a sensor system signature based on the received update data and the retrieved pre-shared sensor key; and
comparing the sensor system signature with the server signature and processing the update data if the sensor system signature and the server signature are identical.

2. The method according to claim 1,
wherein the calculation of the server signature and the calculation of the sensor system signature uses a Hash function based on one of the following algorithms: Elliptic Curve Algorithm, SHA256, SHA1 or MD5.

3. The method according to claim 1, further comprising:
encrypting the update data using the pre-shared key at the update server side and decrypting the encrypted update data using the pre-shared key at the sensor system,
wherein encrypting the update data is performed before the server signature is calculated and decrypting the update data is performed if the server signature and the sensor system signature are identical.

4. The method according to claim 1, further comprising:
performing at the update server side:
including a freshness in the calculation of the server signature and transmitting the freshness together with the update data and the server signature to the sensor system to be updated,
performing at the sensor system to be updated:
including the received freshness in the calculation of the sensor system signature.

5. The method according to claim 4,
wherein the freshness is calculated based on a pseudo random number calculation, time information or GPS information.

6. The method according to claim 1, further comprising:
performing at the update server side:
segmenting the update data into multiple chunks;
calculating for each update data chunk the server signature; and
transmitting each update data chunk together with the corresponding server signature to the sensor system to be updated; and
performing at the sensor system to be updated:
calculating the sensor system signature for each received update data chunk;
comparing the sensor system signature with the corresponding server signature for each received update data chunk; and
reassembling the update data from the received update data chunks if for each received update data chunk the calculated sensor system signature is identical to the corresponding server signature.

7. The method according to claim 6, further comprising:
performing at the update server side:
calculating the total size of the update data and the size of the update data chunks on basis of the total update data and the maximum size of data packages that can be transmitted from the update server to the sensor system to be updated.

8. The method according to claim 6, further comprising:
performing at the update server side:
  calculating a global server signature based on the unsegmented update data, the retrieved pre-shared sensor key and freshness after all update data chunks have been transmitted to the sensor system to be updated; and
  transmitting the global server signature and freshness to the sensor system to be updated; and
performing at the sensor system to be updated:
  calculating a global sensor system signature based on the reassembled update data from all received update data chunks, the retrieved pre-shared sensor key and received freshness; and
  processing the reassembled update data if the global sensor system signature and the global server signature are identical.

9. The method according to claim 1, further comprising:
performing at the sensor system to be updated:
  initiating the update procedure by transmitting an update request to the update server,
  wherein the update request comprises at least a sensor system ID and further necessary information; and
performing at the update server side:
  retrieving the retrieved pre-shared sensor key based on the received sensor system ID.

10. The method according to claim 9, further comprising:
performing at the sensor system to be updated:
  calculating a sensor system signature for the update request based on the information inside the update request, the retrieved pre-shared sensor key and freshness; and
performing at the update server side:
  calculating a server signature based on the information received in the update request, the retrieved pre-shared sensor key and received freshness in the update request; and
  processing the update request if the calculated server signature and the received sensor system signature are identical.

11. The method according to claim 1,
wherein the transmissions between the update server and the sensor system to be updated are sent over the air and/or over vehicle connectivity.

12. The method according to claim 1,
wherein the update server stores pre-shared sensor keys for multiple sensor systems in a database.

13. The method according to claim 1,
wherein the sensor system stores the retrieved pre-shared sensor key on a chip.

14. The method according to claim 13,
wherein the retrieved pre-shared sensor key is stored on the chip as non-readable information, which can be only used for calculations.

* * * * *